(12) United States Patent
Shin et al.

(10) Patent No.: US 6,587,170 B2
(45) Date of Patent: Jul. 1, 2003

(54) LIQUID CRYSTAL DISPLAY DEVICE HAVING A LIGHT SHIELDING MATRIX

(75) Inventors: Hyunho Shin, Kunpo-shi (KR); Chae Gee Sung, Incheon-shi (KR); Kouji Takashina, Yokohama (JP)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/854,504

(22) Filed: May 15, 2001

(65) Prior Publication Data

US 2002/0003597 A1 Jan. 10, 2002

Related U.S. Application Data

(63) Continuation of application No. 09/012,041, filed on Jan. 22, 1998, now Pat. No. 6,271,903.

(30) Foreign Application Priority Data

Jan. 23, 1997 (JP) .............................. 9-010691

(51) Int. Cl.$^7$ ......................................... G02F 11/1336
(52) U.S. Cl. ...................................... 349/110; 349/141
(58) Field of Search ................................. 349/141, 110

(56) References Cited

U.S. PATENT DOCUMENTS

| | | | | |
|---|---|---|---|---|
| 5,039,204 A | * | 8/1991 | Choi ........................... | 359/67 |
| 5,598,285 A | | 1/1997 | Kondo et al. ................. | 349/39 |
| 5,781,261 A | * | 7/1998 | Ohta et al. .................. | 349/111 |
| 5,786,876 A | * | 7/1998 | Ota et al. ..................... | 349/42 |
| 5,805,247 A | * | 9/1998 | Oh-e et al. ................... | 349/42 |
| 5,831,701 A | * | 11/1998 | Matsuyama et al. ........ | 349/110 |
| 5,907,379 A | * | 5/1999 | Kim ............................ | 349/141 |

FOREIGN PATENT DOCUMENTS

| | | |
|---|---|---|
| EP | 06-99939 | 3/1996 |
| JP | 6-160878 | 6/1994 |
| JP | 6-273803 | 9/1994 |
| JP | 07-301814 | 11/1995 |
| JP | 09-269504 | 10/1997 |

OTHER PUBLICATIONS

Matsumoto, et al., LP–A: Display Characteristics of In–Plane–Switching (IPS) LCDs and a Wide–Viewing–Angle 14.5–in. IPS TFT–LCD, Euro Display 96, 10/1–3/96, pp. 445–448.

* cited by examiner

Primary Examiner—James Dudek
(74) Attorney, Agent, or Firm—McKenna Long & Aldridge LLP

(57) ABSTRACT

A liquid crystal display device composed of: a first substrate and a second substrates; a liquid crystal layer provided between the first and second substrates; a plurality of pixel regions provided on the surface opposing the second substrate of the first substrate, each of which pixel regions has at least one pixel electrode and a common electrode for cooperatively applying an electric field in a direction along the surface of the first substrate; and a conductive light shielding matrix provided on the surface opposing the first substrate of the second substrate which light shielding matrix has openings each corresponding to a display region of each of the pixel regions and shades non-display regions other than the pixel regions; in which the light shielding matrix and the common electrode are set to substantially the same voltage.

14 Claims, 14 Drawing Sheets

VOLTAGE OFF (DARK STATE)

VOLTAGE ON (BRIGHT STATE)

LIQUID CRYSTAL DISPLAY DEVICE HAVING A LIGHT SHIELDING MATRIX

This application is a Continuation of application Ser. No. 09/012,041 Filed on Jan. 22, 1998 now U.S. Pat. No. 6,271,903.

BACKGROUND OF THE INVENTION

1. Field of the Invention

The present invention relates to a liquid crystal display device in which alignment of liquid crystal can be controlled by applying an electric field along the substrate face, and relates to a structure in which in addition to a wider angle of view, a higher aperture ratio can be achieved.

2. Description of the Prior Art

Recent TN mode liquid crystal display devices have a problem of high dependency on the angle of view, since the visibility in the vertical direction is inferior in spite of excellent visibility in the lateral direction. The applicant of this application claimed liquid crystal display devices having a structure by which the above problem can be solved in Japanese Patent Application Nos. 7-1579, 7-306276, and the like.

According to the techniques described in such Patent Applications, instead of providing liquid crystal driving electrodes for each of the upper and lower substrates sandwiching the liquid crystal layer, two types of linear electrodes 12 and 13 having different polarity from each other are provided only on the lower substrate 11 at a distance from each other, as is shown in FIG. 10, and no electrode is formed on the upper substrate 10 shown in the upper side of FIG. 10 so that liquid crystal molecules 36 are aligned in the direction of the transverse electric field (in the substrate-face direction) which is generated between the linear electrodes 12 and 13 by applying a voltage.

In more detail, as is shown in FIG. 9, the linear electrodes 12 are connected by a base line 14 to form a comb-shaped electrode 16, the linear electrodes 13 are connected by a base line 15 to form a comb-shaped electrode 17, the comb-shaped electrodes 16 and 17 are engaged with each other such that the linear electrodes 12 and 13 are alternately positioned without being in contact with each other, and a switching element 19 and a power source 18 are connected to the base lines 14 and 15.

As is shown in FIG. 11A, an alignment film is formed on the liquid-crystal side of the upper substrate 10 to align the liquid crystal molecules 36 in the β direction, another alignment film is formed on the liquid-crystal side of the lower substrate 11 to align the liquid crystal molecules 36 in the γ direction parallel to the β direction, and a polarizing plate polarizing light in the β direction shown in FIG. 11A and a polarizing plate polarizing light in the a direction are provided for the substrates 10 and 11, respectively.

According to the above structure, the liquid crystal molecules 36 are homogeneously aligned in the same direction when no voltage is applied between the linear electrodes 12 and 13, as is shown in FIGS. 11A and 11B. In this state, a light beam transmitted through the lower substrate 11 is polarized in the α direction by the polarizing plate, passes through a layer of the liquid crystal molecules 36, and then reaches the polarizing plate of the upper substrate 10, which polarizing plate has a polarization direction α different from the direction β. The light beam is thereby shaded by the polarizing plate of the upper substrate 10 and is unable to pass through the liquid crystal display device, thereby rendering the liquid crystal display device in a dark state.

When a voltage is applied between the linear electrodes 12 and 13, among the liquid crystal molecules 36, those adjacent to the lower substrate 11 are aligned perpendicular to the longitudinal direction of the linear electrodes 12 and 13. The nearer a liquid crystal molecule is located to the lower substrate 11, the more strongly this phenomenon is observed. In other words, lines of electric force perpendicular to the longitudinal direction of the linear electrodes 12 and 13 are generated by the transverse electric field (an electric field in the substrate-face direction) produced by the linear electrodes 12 and 13. Thus, the major axes of the liquid crystal molecules 36 aligned in the γ direction by the alignment film formed on the lower substrate 11 are altered to the a direction, i.e., perpendicular to the γ direction, by the force of the electric field which is stronger than that of the alignment film, as is shown in FIG. 12A.

Therefore, twisted alignment is achieved in the liquid crystal molecules 36 by applying a voltage between the linear electrodes 12 and 13, as is shown in FIGS. 12A and 12B. In this state, the polarization direction of the polarized light beams, which have been transmitted through the lower substrate 11 and polarized in the α direction, is converted by the twisted liquid crystal molecules 36 so that the polarized light beams are allowed to pass through the upper substrate 10 having a polarizing plate whose polarization direction β is different from the α direction. The liquid crystal display device thereby exhibits a bright state.

FIGS. 13 and 14 are an enlarged fragmentary view of the structure of an actual active-matrix liquid crystal driving circuit to which a liquid crystal display device equipped with the linear electrodes 12 and 13 is applied.

The structure shown in FIGS. 13 and 14 corresponds to only one pixel. On a transparent substrate 20 such as a glass substrate, a gate electrode 21 and linear common electrodes 22 both made of a conductive layer are separately provided parallel to each other. A gate insulating film 24 is formed to cover these electrodes. A thin-film transistor T is formed such that a source electrode 27 and a drain electrode 28 are formed on a portion of the gate insulating film 24 corresponding to the gate electrode 21, and a semiconductor film 26 is provided on a portion of the gate insulating film 24 between the source electrode 27 and the drain electrode 28. A linear pixel electrode 29 made of a conductive layer is formed on a portion of the gate insulating film 24 between the common electrodes 22.

FIG. 13 is a plan view of these electrode. Gate lines 30 and signal lines 31 are formed on the transparent substrate 20 according to a matrix pattern. The gate electrode 21 which is a part of the gate line 30 is provided at a corner of each pixel region formed by the gate lines 30 and the signal lines 31. Via a capacitor electrode 33, the drain electrode 28 above the gate electrode 21 is connected to the pixel electrode 29 which is provided between the common electrodes 22 in parallel with the signal line 31 and the common electrodes 22.

The ends, near the gate line 30, of the common electrodes 22 are connected by a connecting line 34, provided in the pixel region in parallel with the gate line 30, and the other ends of the common electrodes 22 are connected by a common line 35, provided in the pixel region in parallel with the gate line 30. The common line 35 is provided over numerous pixel regions in parallel with the gate line 30 so as to apply a common voltage to the common electrodes 22 provided for each pixel region.

As is shown in FIG. 14, on the surface, opposing the substrate 20, of the substrate 37, a light shielding matrix 38 is formed with an opening 38a corresponding to a pixel region, and a color filter 39 is also provided to cover the opening 38a.

In the above structure shown in FIGS. 13 and 14, lines of electric force generated by a transverse electric field can be obtained along the directions of the arrows a shown in FIG. 14. Thus, the liquid crystal molecules 36 are aligned by the transverse electric field in a manner shown in FIG. 14. The dark and bright states are thereby switchable by controlling the alignment of the liquid crystal molecules 36 similarly to the above description made with reference to FIGS. 11 and 12.

However, according to liquid crystal display devices having the above structure, the aperture ratio is disadvantageously reduced in spite of a wide angle of view. In other words, although the liquid crystal molecules 36 are aligned by the transverse electric field generated between the pixel electrode 29 and the common electrodes 22 in the structure shown in FIGS. 13 and 14, in regions above the common electrodes 22, the direction of the electric field applied to the liquid crystal molecules 36 differs from that of the transverse electric field, and thus the alignment direction of the liquid crystal molecules 36 in the regions above the common electrodes 22 is different from that in the region between the pixel electrode 29 and the common electrodes 22, as is shown in FIG. 10.

Therefore, as is shown in FIG. 14, the light shielding matrix 38 is conventionally employed for shading the regions above the common electrodes 22, which regions may cause problems such as light leakage. Furthermore, the periphery of the opening 38a of the light shielding matrix 38 is positioned slightly inside the inner end 22a of each common electrode 22, thereby increasing the region shaded by the light shielding matrix 38. Thus, the aperture ratio of the resulting liquid crystal display device cannot be increased.

SUMMARY OF THE INVENTION

In view of the above-mentioned problems, it is an object of the present invention to provide a liquid crystal display device having a high aperture ratio while maintaining a wide angle of view, in which the liquid crystal is driven by a transverse electric field.

To solve the above object, a liquid crystal display device of the present invention is composed of: a first substrate and a second substrate; a liquid crystal layer provided between the first and second substrates; a plurality of pixel regions provided on the surface opposing the second substrate of the first substrate, each of which pixel regions has at least one pixel electrode and a common electrode cooperatively applying an electric field in a direction along the surface of the first substrate; and a conductive light shielding matrix provided on the surface opposing the first substrate of the second substrate, which light shielding matrix has openings, each opening corresponding to a display region of each of the pixel regions, and shades non-display regions other than the pixel regions; in which the light shielding matrix and the common electrode are set to substantially the same voltage.

In addition, a liquid crystal display device of the present invention may be composed of: a first substrate and a second substrate; a liquid crystal layer provided between the first and second substrates; a plurality of pixel regions provided on the surface opposing the second substrate of the first substrate, each of which pixel regions has at least one pixel electrode and a common electrode cooperatively applying an electric field in a direction along the surface of the first substrate; and a conductive light shielding matrix provided on the surface opposing the first substrate of the second substrate, which light shielding matrix has openings, each opening corresponding to a display region of each of the pixel regions, and shades non-display regions other than the pixel regions; in which a conductive film at substantially the same voltage as the common electrode is formed at least above the light shielding matrix with an insulating film interposed therebetween, and the light shielding matrix and the common electrode are set to substantially the same voltage.

According to such structures, a transverse electric field can be applied to the liquid crystal layer by the common electrode and the pixel electrode both provided on the substrate, thereby switching a dark state and a bright state. In addition, since the common electrode and the light shielding matrix or the conductive layer are set to substantially the same voltage, the lines of electric force of the transverse electric field applied to liquid crystal molecules near the common electrode can be uniform. Thus, alignment disorder of the liquid crystal molecules in a region near the common electrode can be reduced, the liquid crystal molecules in that region can be used for displaying, and thus the region is not required to be shaded by the light shielding matrix. The light shielding matrix is thereby allowed to have larger openings as compared with those in the prior art, resulting in an improved aperture ratio.

In the above liquid crystal display device, the voltage difference is preferably set in a range of from 0.5 V to +0.5 V, both inclusive.

When the voltage difference between the common electrode and the light shielding matrix is outside the above range, the lines of electric force applied to the liquid crystal in the region corresponding to the common electrode are disturbed so that the alignment disorder of the liquid crystal molecules 36 is readily increased and causes problems such as light leakage. Thus, it becomes impossible to enlarge the opening of the light shielding matrix and to improve the aperture ratio.

Furthermore, a liquid crystal display device of the present invention may have the following structure: the common electrode formed on the first substrate is extended to a peripheral edge of the first substrate, the light shielding matrix or the conductive film formed on the second substrate is extended to a peripheral edge of the second substrate, and the common electrode and the light shielding matrix or the conductive film are electrically connected via a conductive member at the peripheral edge of the first and second substrates.

Moreover, a liquid crystal display device of the present invention may have the following structure: the liquid crystal layer is encapsulated between the first and second substrates by a sealing member, the common electrode formed on the first substrate is extended outside the sealing position of the sealing member on the first substrate, the light shielding matrix or the conductive film formed on the second substrate is extended outside the sealing position of the sealing member on the second substrate, and the common electrode and the light shielding matrix or the conductive film are electrically connected at a position outside the sealing member via a conductive member provided between the first and second substrates.

According to the above structures, the common electrode and the light shielding matrix or the conductive film can be readily connected electrically at substantially the same voltage, thereby achieving a liquid crystal cell having a wide angle of view and a high aperture ratio.

DESCRIPTION OF THE PREFERRED EMBODIMENT

The present invention will be better understood from the following description of the preferred embodiments taken in conjunction with the accompanying drawings.

Figure 1:
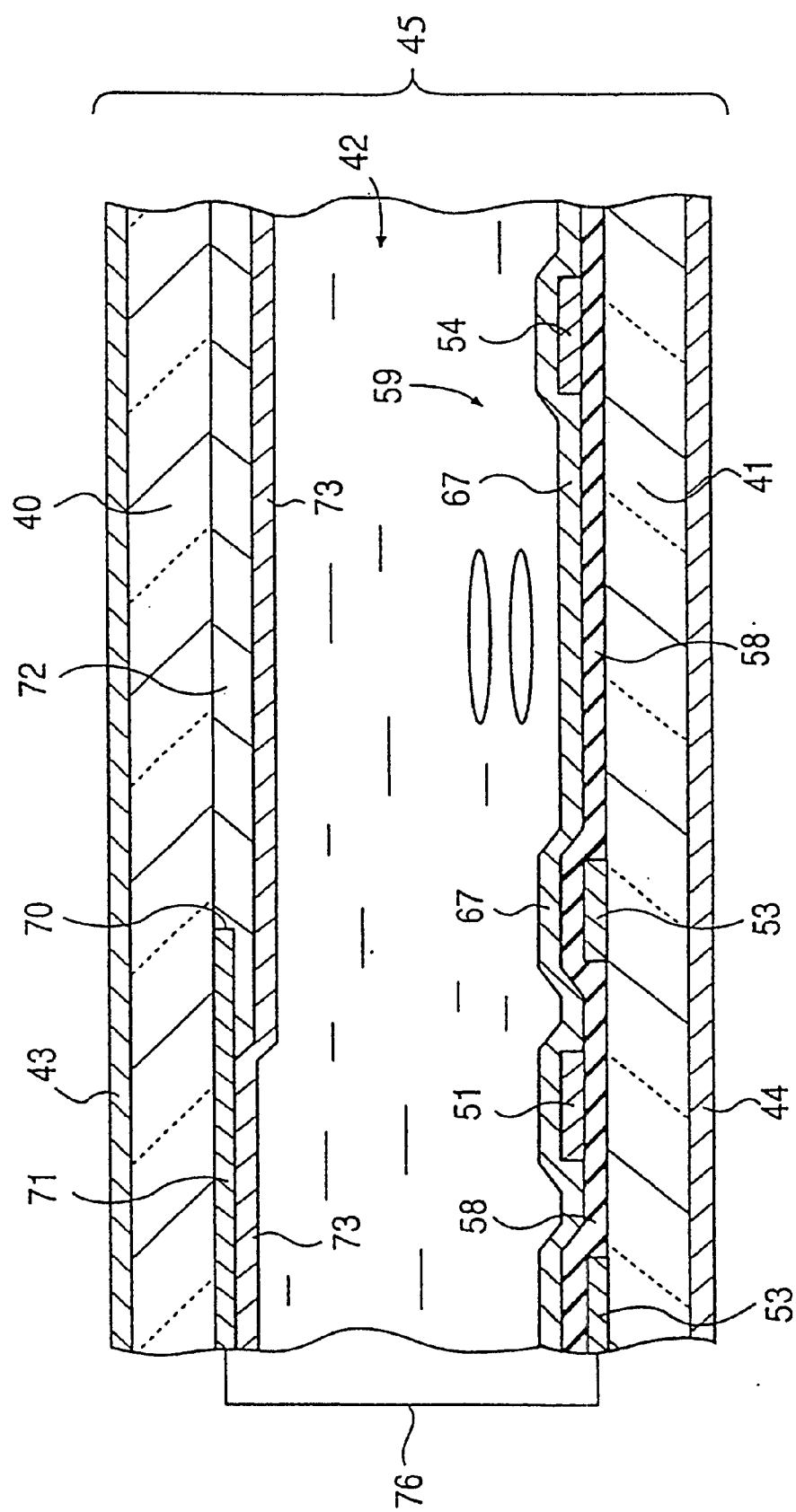
FIG. 1 is a fragmentary cross-sectional view showing a liquid crystal display device of the first embodiment incorporated in the present invention.

FIGS. 1 to 4 show main sections of a liquid crystal display device of the first embodiment incorporated in the present invention. In FIG. 1, an upper substrate (second substrate) 40 and a lower substrate (first substrate) 41 are positioned opposing each other with a predetermined space (cell gap) therebetween, a liquid crystal layer 42 is formed between the substrates 40 and 41, and polarizing plates 43 and 44 are provided on the outer surface of the substrates 40 and 41, respectively.

These substrates 40 and 41 are made of a transparent material such as glass. For actually preparing the above structure, the periphery of the substrates 40 and 41 is sealed by a sealing member, and a space formed by the substrates 40 and 41 and the sealing member is filled with a liquid crystal to form the liquid crystal layer 42. A liquid crystal cell 45 is obtained by assembling the substrates 40 and 41 and the polarizing plates 43 and 44.

Figure 2:
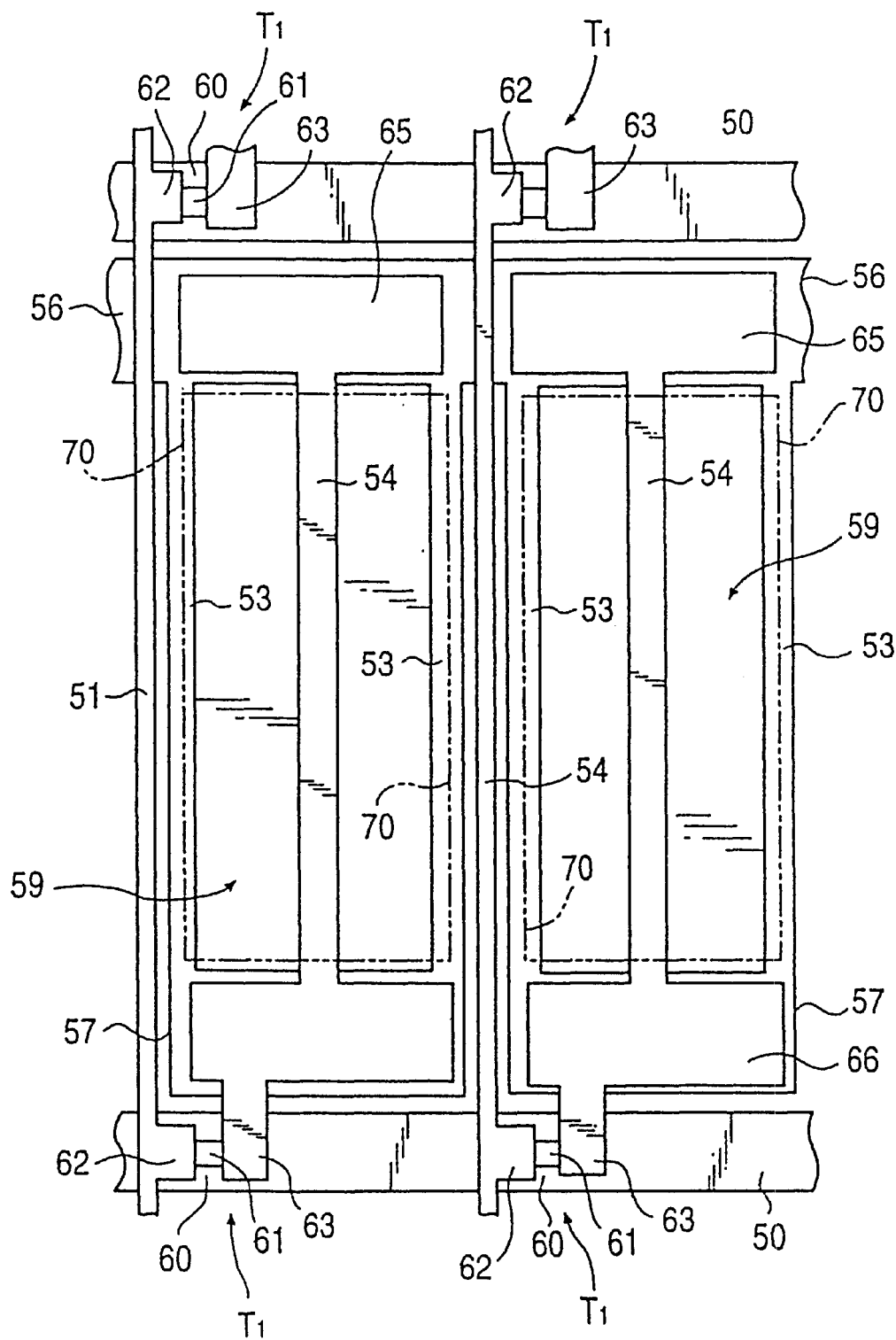
FIG. 2 is a plan view showing an arrangement of electrodes in the first embodiment.

As is shown in FIG. 2, on the transparent substrate 41, a plurality of gate lines 50 and signal lines 51 are formed according to a matrix pattern, and linear electrodes (common electrodes) 53 and another linear electrode (pixel electrode) 54 are provided in parallel with each other in each pixel region 59 formed by the gate lines 50 and the signal lines 51.

In more detail, on the substrate 41, a plurality of gate lines 50 are formed in parallel with each other at predetermined intervals; common lines 56 are provided along the gate lines 50 on the same plane as that of the gate lines 50; in each region formed by the gate lines 50 and the signal lines 51, two linear common electrodes 53 are extended from the common line 56 in a perpendicular direction to the common line 56; near an adjacent gate line 50, the ends of the two common electrodes 53 are connected by a connecting line 57; and each region formed by the gate lines 50 and the signal lines 51 is used as the pixel region 59.

Although, numerous pixel regions 59 required for a liquid crystal display device are provided in the liquid crystal cell 45 as a whole, FIG. 1 shows a fragmentary cross-sectional structure of one pixel region 59 and FIG. 2 shows a plan structure corresponding to two adjacent pixel regions 59.

Each of the thin-film transistors (switching elements) $T_1$ shown in FIG. 2 is formed as follows: an insulating layer 58 covering the above-mentioned lines is formed on the substrate 41, as is shown in FIG. 1; the gate lines 50 and the signal lines 51 are formed on the insulating layer 58 such that each of the gate line 50 and the signal lines 51 perpendicularly cross each other to form a matrix pattern on the plan view; a portion of the gate line 50 near an intersection between the gate line 50 and a signal line 51 is used as the gate electrode 60; and a source electrode 62 and a drain electrode 63, between which a semiconductor film 61 is formed, are provided on a portion of the insulating layer 58 above the gate electrode 60. In the center of each pixel region 59, a linear pixel electrode 54 is provided in parallel with the common electrodes 53. A capacitance generating section 65 is formed by extending one end of the pixel electrode 54 on a portion of the insulating layer 58 above the common line 56 and another capacitance generating section 66 is formed by extending the other end of the pixel electrode 54 on a portion of the insulating layer 58 above the connecting line 57. The capacitance generating sections 65 and 66 are provided for generating capacitance between the insulating layer 58 and the common line 56 or the connecting line 57 so as to cancel the parasitic capacitance at the time of driving the liquid crystal.

The source electrode 62 is connected to the signal line 51, the drain electrode 63 is connected to the capacitance generating section 66 formed on the portion of the insulating layer 58 above the connecting line 57, and they are covered with an alignment film 67, as is shown in FIGS. 1 and 2.

The electrodes 53 and 54 used for the above first embodiment may be formed as either a light-shading metallic electrode or a transparent electrode. However, in the case of employing the undermentioned normally black mode display, transparent electrodes made of ITO (indium tin oxide), etc. are preferable.

On the lower surface of the substrate 40, a light shielding matrix 71 is formed with an opening 70 corresponding to the pixel region 59 formed on the substrate 41, and a color filter 72 is also provided to cover the opening 70. An alignment film 73 covering the light shielding matrix 71 and the color filter 72 is also formed. The light shielding matrix 71 is made of a light-shading metallic film composed of a Cr layer alone or composed of a CrO layer and a Cr layer, and is used for shading non-display portions of each pixel region 59 such that it shades the common line 56, the connecting line 57, the signal line 51, and the gate line 50 in each pixel region 59 and it also shades a part of the common electrode 53 in the width direction. In other words, as is shown by the dotted chain lines of FIG. 2, substantially the entire region between the common electrodes 53 of each pixel region 59 and almost the common electrodes 53 as a whole in the width direction are exposed by the opening 70 of the light shielding matrix 71.

In the case of a color liquid crystal display device, color filters 72 (red, green, and blue) are provided for pixel regions 59, as is shown in FIG. 1. However, the color filters 72 can be omitted in monochrome liquid crystal display devices.

Figure 3:
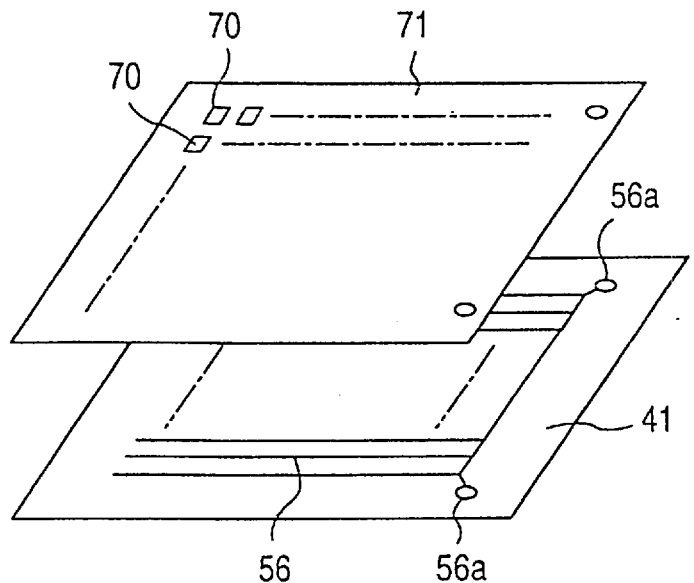
FIG. 3 is a perspective view showing a light shielding matrix and a substrate surface in the first embodiment.
Figure 4:
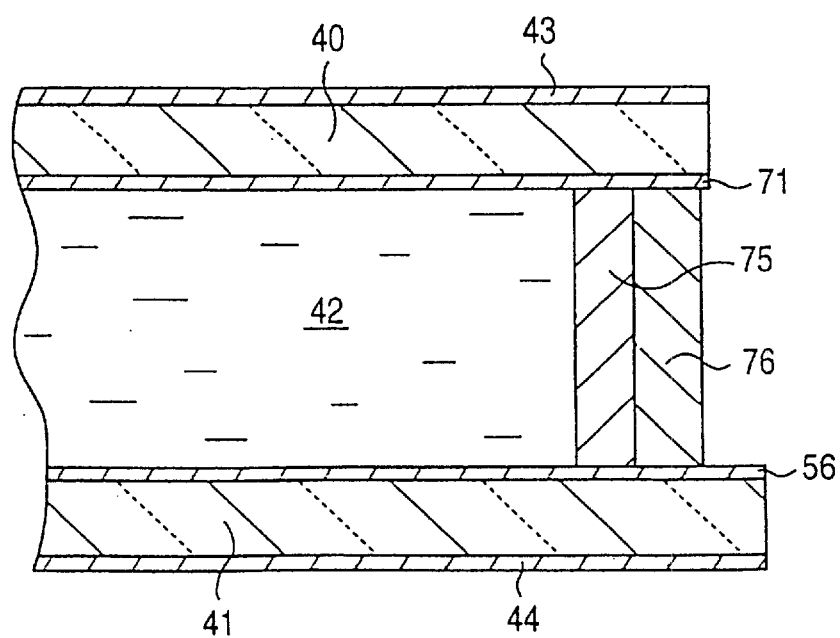
FIG. 4 is a fragmentary cross-sectional view showing the structure of a connection portion at a peripheral edge of the substrates in the first embodiment.

The periphery of the light shielding matrix 71 formed on the substrate 40 is extended outside the sealing member 75 provided on the periphery of the substrate 40 for sealing the liquid crystal, as is shown in FIG. 4. The common lines 56 formed on the substrate 41 are extended outside the sealing member 75 provided on the periphery of the substrate 41 for sealing the liquid crystal, as is shown in FIGS. 3 and 4. As is shown in FIG. 4, terminals 56a connecting to the common lines 56 are provided on the periphery of the substrate 41 and connected to the light shielding matrix 71 by a conductive member 76 such as an Ag paste provided between the substrates 40 and 41 so that the light shielding matrix 71 and the common lines 56 (common electrodes 53) have the same voltage (ground voltage). Two terminals 56a are employed in the first embodiment so as to ensure the connection between one terminal and the light shielding matrix 71 via the conductive member 76 even when the connection between the other terminal 56a and the light shielding matrix 71 is damaged.

In the first embodiment, the light shielding matrix 71 and the common lines 56 (common electrodes 53) are connected to the same voltage, however, they may be substantially at the same voltage and are not required to be at completely the same voltage.

"Substantially the same voltage" is defined as follows: the voltage difference between the light shielding matrix 71 and the common electrodes 53 is in a range of from −0.5 V to +0.5 V, both inclusive.

In the liquid crystal display device of the first embodiment, the alignment film 73 of the substrate 40 and the alignment film 67 of the substrate 41 are aligned in a direction substantially parallel to the longitudinal direction of the common electrodes 53 The liquid crystal molecules in the liquid crystal layer 42 interposed between the substrates 40 and 41 are thereby homogeneously aligned such that the major axis of the liquid crystal molecules is in parallel with the longitudinal direction of the common electrodes 53 without an applied electric field.

Furthermore, in the structure of the first embodiment, the polarization axis of the polarizing plate 43 is in a direction substantially parallel to the longitudinal direction (the sheet-thickness direction of FIG. 1) of the common electrodes 53, and the polarization axis of the polarizing plate 44 is in a direction substantially perpendicular to the longitudinal direction (the lateral direction of FIG. 1).

According to the above structure incorporated in the present invention, the dark state and the bright state can be switched by switching the application of a voltage between the common electrodes 53 and pixel electrode 54 that are in the desired pixel regions 59 using the thin film transistor $T_1$ i.e., a switching element.

Figure 12A:
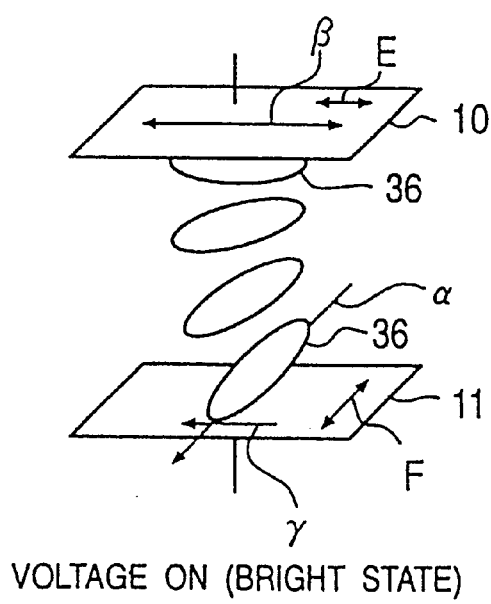
FIG. 12A shows alignment of liquid crystal molecules in a bright state of a liquid crystal display device of the prior art, in which device alignment of the liquid crystal molecules is controlled by applying a transverse electric field.
Figure 12B:
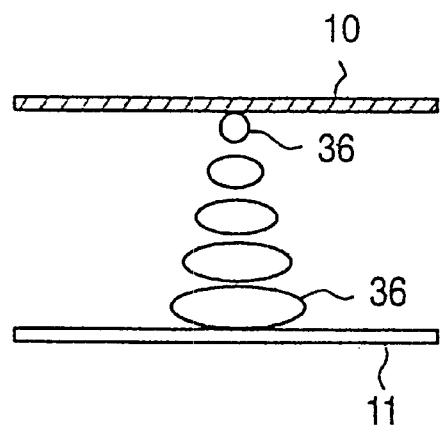
FIG. 12B is a side view of the alignment shown in FIG. 12A.
Figure 13:
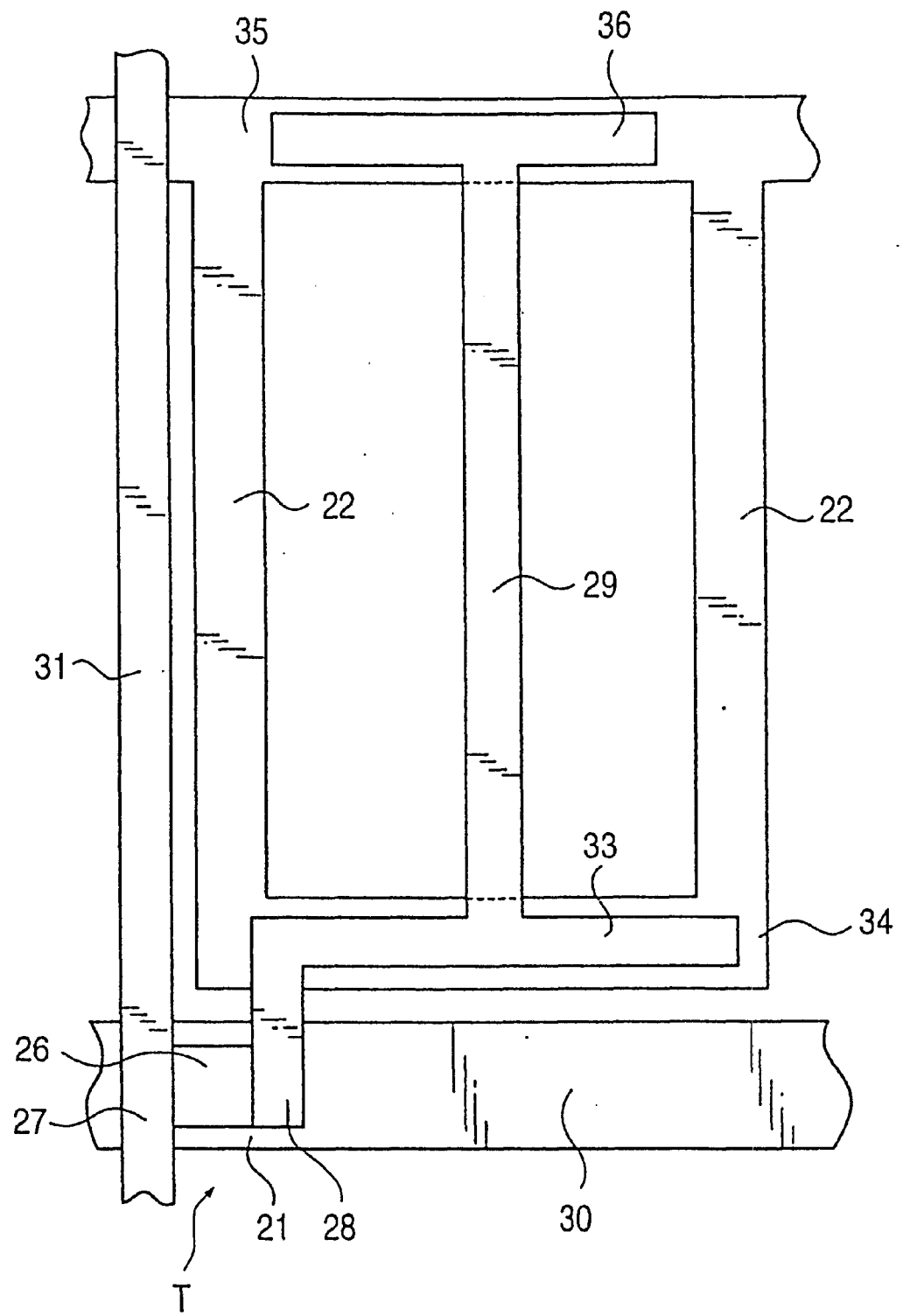
FIG. 13 is a plan view showing linear electrodes in a liquid crystal display device of the prior art, in which device alignment of liquid crystal molecules is controlled by applying a transverse electric field.

In other words, when a voltage is applied between the common electrodes 53 and pixel electrodes 54 that are in the desired pixel regions 59 by operating the thin-film transistor $T_1$, an electric field is generated in the transverse direction of FIG. 1 and is applied to the liquid crystal layer. The liquid crystal molecules are thereby twisted between the substrates 40 and 41, resulting in a bright state similarly to FIG. 12.

Figure 11A:
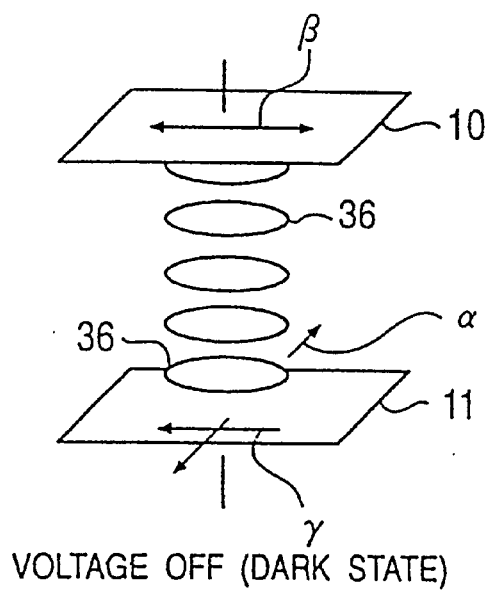
FIG. 11A shows alignment of liquid crystal molecules in a dark state of a liquid crystal display device of the prior art, in which device alignment of the liquid crystal molecules is controlled by applying a transverse electric field.
Figure 11B:
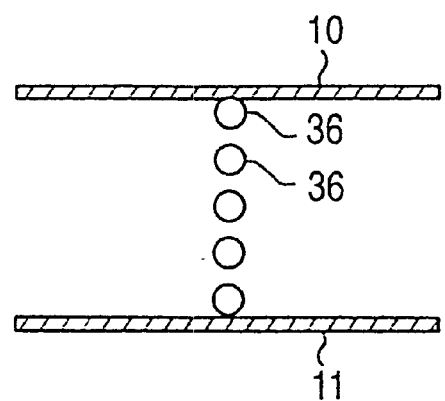
FIG. 11B is a side view of the alignment shown in FIG. 11A.

With no applied voltage between the common electrodes 53 and pixel electrodes 54, the liquid crystal molecules are homogeneously orientated in the same direction as the alignment direction of the alignment films 67 and 73, resulting in a dark state similarly to FIG. 11.

The alignment of the liquid crystal molecules is controlled as mentioned above. Thus, the light beams, which emerge from a back light provided below the substrate 41, are shaded or transmitted according to the alignment of the liquid crystal molecules. In this case, the display is in the so-called normally black mode such that the display is in the dark state without controlling the alignment of the liquid crystal molecules and is in the bright state when the alignment of the liquid crystal molecules is controlled. Since the liquid crystal molecules 36 are aligned homogeneously along the substrate-face direction or twisted by 90° between the substrates 40 and 41, the resulting liquid crystal display device has a wide angle of view and a small dependency of transmittance on the angle of view.

Figure 14:
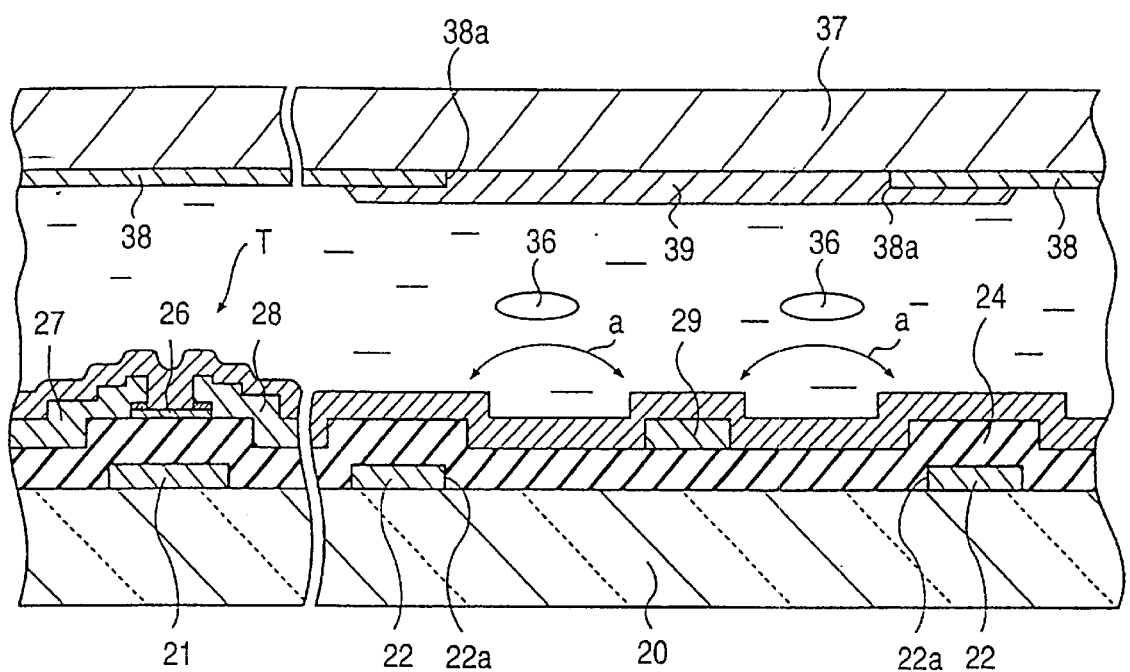
FIG. 14 shows the cross-sectional structure of the liquid crystal display device shown in FIG. 13.

According to the structure of the first embodiment, it is possible to set the light shielding matrix 71 and the common electrodes 53 at substantially the same voltage. Thus, the disturbance of the lines of electric force in regions corresponding to the common electrodes 53 can be reduced, and as a result, alignment disorder of the liquid crystal molecules can be decreased. In other words, in the structure shown in FIG. 14, since the light shielding matrix 38 is electrically floating, it may be affected by a surrounding electric field and have a variable voltage. Thus, the liquid crystal alignment in the regions corresponding to the common electrodes 22 may be disturbed by the voltage generated in the light shielding matrix 38. However, according to the structure of the first embodiment incorporated in the present invention, the light shielding matrix 71 and the common electrodes 53 are grounded at substantially the same voltage. Thus, the disturbance of the electric field in the regions corresponding to the common electrodes 53 is reduced, and the alignment of the liquid crystal molecules in the regions corresponding to the common electrodes 53 is improved as compared with conventional structures. As a result, problems such as light leakage in the regions corresponding to the common electrodes 53 do not readily occur. Therefore, the opening 70 of the light shielding matrix 71 can also be extended to the region (the region above the common electrodes 53) in which light leakage does not occur, resulting in a liquid crystal display device having a high aperture ratio.

Therefore, the dark state and the bright state can be switched according to the liquid crystal alignment controlled by applying a transverse electric field, thereby providing a liquid crystal display device having a high aperture ratio and small dependency on the angle of view.

In the structure of the first embodiment, "substantially the same voltage" means preferably as follows: the voltage difference between the light shielding matrix 71 and the common electrodes 53 is set in a range of from −0.5 V to +0.5 V, both inclusive.

When the voltage difference between the light shielding matrix 71 and the common electrodes 53 is outside the above range, the lines of electric force applied to the liquid crystal in the regions corresponding to the common electrodes 53 are disturbed so that the alignment disorder of the liquid crystal molecules is readily increased and causes problems such as light leakage. Thus, it becomes impossible to enlarge the opening 70 of the light shielding matrix 71 and to improve the aperture ratio.

Furthermore, the driving voltage for obtaining the maximum transmittance as a liquid crystal display device can be reduced in the structure of the first embodiment, because the aperture ratio is improved by the enlargement of the opening 70 of the light shielding matrix 71, which enlargement is achieved by reducing the alignment disorder of the liquid crystal molecules 36 in the regions corresponding to the common electrodes 53.

The parasitic capacitance generated in the liquid crystal display device can be partially canceled by a capacitance formed between the capacitance generating sections 65 and 66 and the common and connecting lines 56 and 57, both of which oppose the capacitance generating sections 65 and 66 with the insulating layer 58 interposed therebetween.

Figure 5:
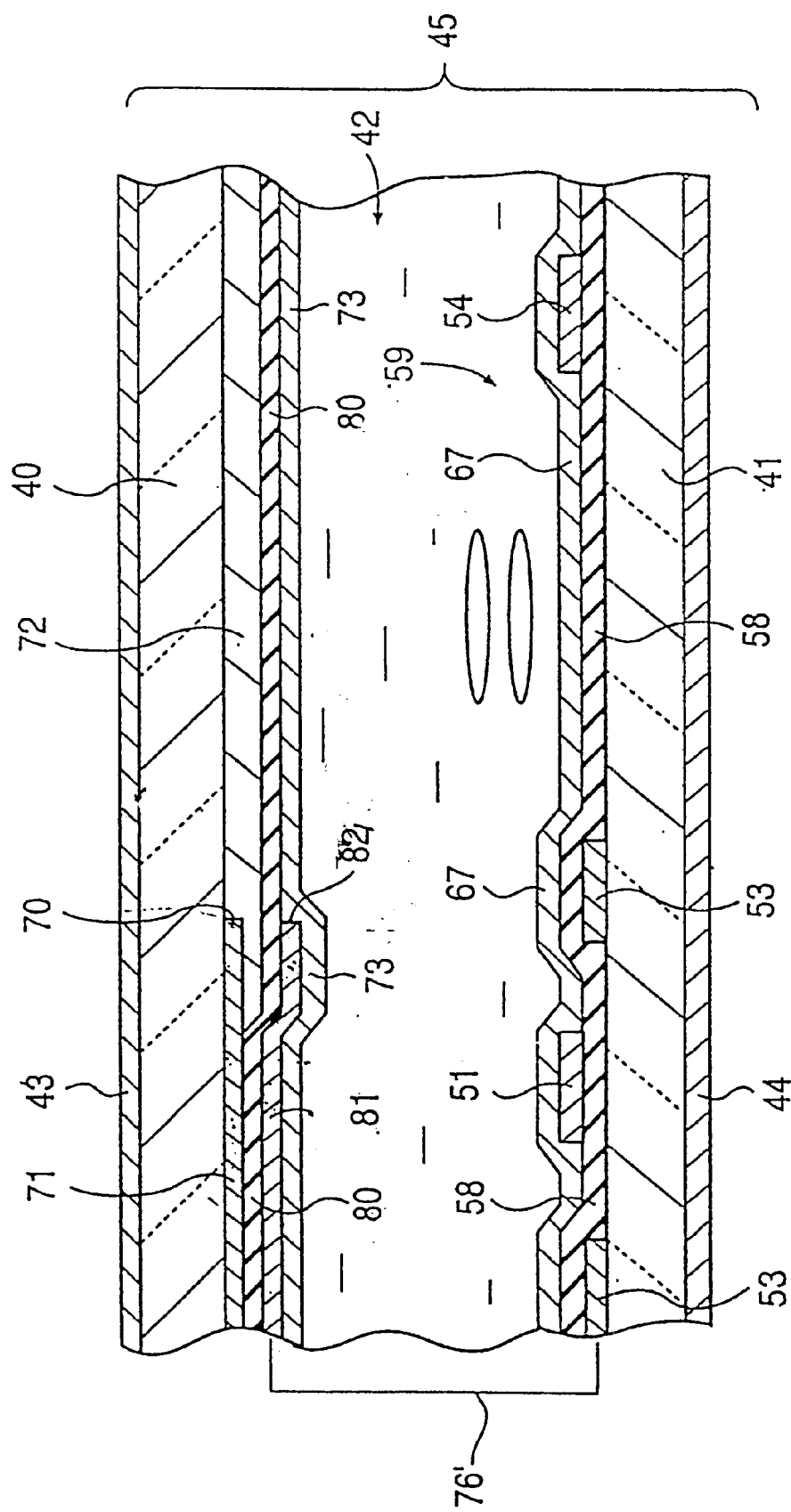
FIG. 5 is a fragmentary cross-sectional view showing a liquid crystal display device of the second embodiment incorporated in the present invention.

FIG. 5 shows a main section of a liquid crystal display device of the second embodiment, the reference numerals in FIG. 5 identify substantially identical parts in the first embodiment shown in FIG. 1, and detailed explanations thereof are omitted.

The liquid crystal display device of the second embodiment is different from that of the first embodiment in the following aspects: an insulating film 80, such as an over-coat layer, covering the light shielding matrix 71 and the color filter 72 is formed on the lower surface (opposing surface) of the substrate 40; on the insulating film 80, a conductive film 81 is provided with the same pattern as that of the light shielding matrix 71; and the alignment film 73 is formed on the conductive film 81.

Furthermore, according to the second embodiment, the common electrodes 53 and the conductive film 81 are connected by a conductive member 76', and are grounded at substantially the same voltage. The conductive film 81 has an opening 82 with the same pattern as the opening 72 of the light shielding matrix 71.

The conductive layer 81 may be either a shading metallic layer made of Cr, etc. or a transparent conductive layer made of ITO, etc.

In the liquid crystal display device having the structure shown in FIG. 5, the dark state and the bright state are switchable by switching the application of a voltage between the common electrodes 53 and pixel electrodes 54 that are in the desired pixel regions 59 using the thin-film transistor $T_1$ similarly to the first embodiment.

Since the conductive film 81 and the common electrodes 53 are allowed to be at substantially the same voltage, the lines of electric force in the regions corresponding to the common electrodes 53 are less disturbed so that the alignment disorder of the liquid crystal molecules can be decreased.

Therefore, as is similar to the liquid crystal display device of the first embodiment, the opening 70 of the light shielding matrix 71 can be enlarged, and the dark state and the bright state are switchable according to the liquid crystal alignment controlled by a transverse electric field, thereby providing a liquid crystal display device having a high aperture ratio and small dependency on the angle of view.

Furthermore, in the liquid crystal display device of the second embodiment, the conductive layer 81 can be positioned nearer to the liquid crystal molecules as compared with the light shielding matrix 71. Thus, disturbance of the lines of electric force can be further reduced as compared with the first embodiment and the alignment disorder of the liquid crystal in the regions corresponding to the common electrodes 53 is further decreased.

When a shading metallic layer is employed as the conductive film 81 in the second embodiment shown in FIG. 5, the light shielding matrix 71 may be omitted. In such a case, the shading metallic layer is also used as the light shielding matrix 71.

With the light shielding matrix 71 formed on the substrate 40, the disturbance of the lines of electric force applied to the region corresponding to the common electrodes 53 can be reduced even if the conductive film 81 is formed only on the periphery of the opening 70 of the light shielding matrix 71. Thus, the conductive film 81 is not required to have completely the same pattern as the light shielding matrix 71. From the viewpoint of designing, it is easiest to form the conductive film 81 and the light shielding matrix 71 with the same pattern, however, the object of the present invention can be achieved as long as the shape of the conductive film 81 corresponds to the periphery of the opening 70 of the light shielding matrix 71.

EXAMPLE AND COMPARATIVE EXAMPLE

A thin-film-transistor-type liquid crystal display device having a structure shown in FIGS. 1 and 2 was produced as Example.

Two transparent glass substrates 1 mm thick were employed. A thin-film transistor circuit having the linear electrodes was formed on one substrate (first substrate). An alignment film was formed on the thin-film transistor circuit and another alignment film was provided on the other substrate (second substrate). For aligning liquid crystal, the alignment films were rubbed by a rubbing roll in parallel with the longitudinal direction of the linear electrodes. The first and second substrates were positioned opposing each other at a predetermined distance with gap-forming beads interposed therebetween. A liquid crystal was poured into the space formed between the substrates. The first and second substrates were joined to each other using a sealing member and assembled into a liquid crystal cell by providing polarizing plates outside the substrates.

In more detail, this device was prepared as follows: The pitch of the pixel region was 43 µm for the horizontal direction (signal-line direction) and 129 µm for the vertical direction (gate-line direction); the light shielding matrix was made of Cr, 0.3 µm thick, and had 27 µm by 111 µm openings each for a pixel region. The width of the pixel electrode and the common electrode was set to 5 µm, and the distance between the pixel electrode and the common electrode was set to 10 µm.

Thin-film transistors, in each of which a semiconductor film made of a-Si was formed between a gate electrode and a source electrode, were provided each near an intersection between the gate line and the signal line, and covered with an insulating film and a polyimide alignment film in that order. The alignment film was rubbed to complete a thin-film transistor array on the first substrate. The first substrate and the second substrate having a light shielding matrix, color filters, and a polyimide alignment film thereon were positioned opposing each other with a 4-µm gap therebetween. A liquid crystal was encapsulated between the substrates using a sealing member. Two terminals connecting to the portion of the light shielding matrix extended to the peripheral edge of the second substrate outside the sealing member and other two terminals connecting to the common electrodes were connected by an Ag paste so as to complete a liquid crystal display device. In this structure, the light shielding matrix and the common electrodes were grounded.

As Comparative Example, another liquid crystal display device was prepared in which the terminals connecting to the light shielding matrix and those connecting to the common electrodes were not connected such that the light shielding matrix was electrically floating and the common electrodes were grounded.

Figure 6A:
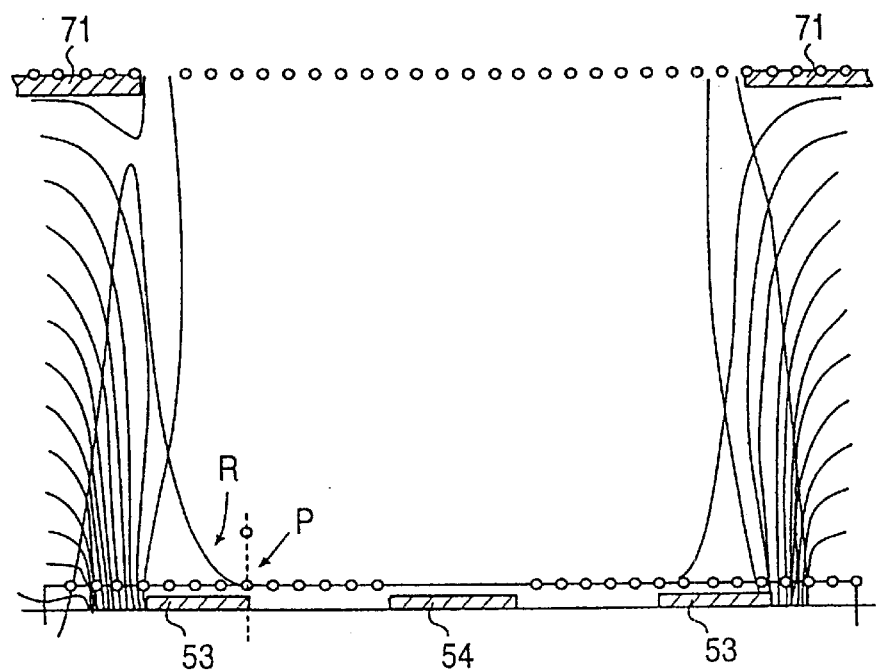
FIG. 6A shows the simulation results obtained from a liquid crystal display device of Example in which a light shielding matrix and common electrodes are connected and grounded.
Figure 6B:
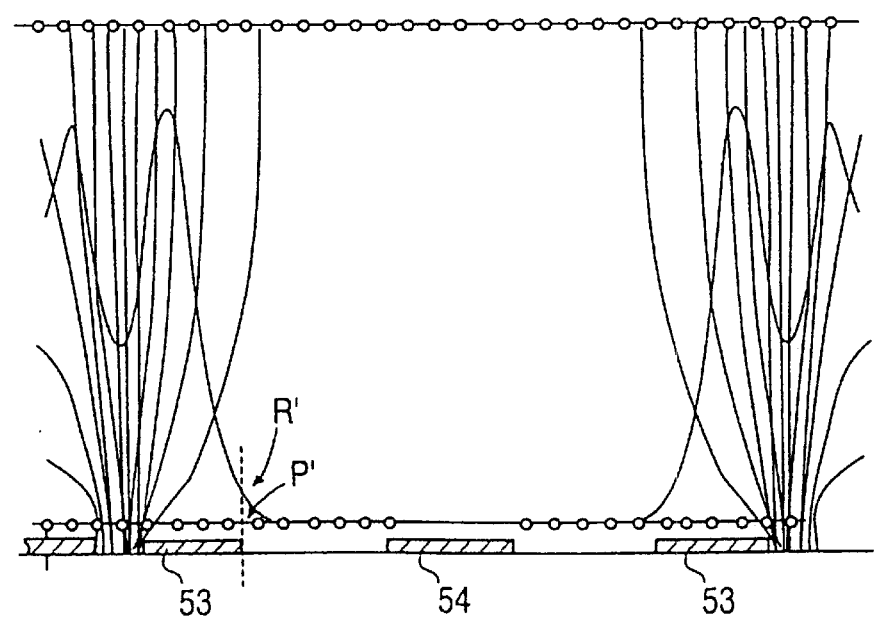
FIG. 6B shows the simulation results obtained from a liquid crystal display device of Comparative Example in which a light shielding matrix and common electrodes are not connected, the light shielding matrix is floating, and the common electrodes are grounded.

FIGS. 6A and 6B show the simulation results of the lines of electric force generated by the pixel electrodes and the common electrodes in the above-mentioned liquid crystal display devices FIG.

FIG. 6A shows the simulation results obtained from the liquid crystal display device of Example in which the light shielding matrix and the common electrodes are connected and grounded, and FIG. 6B shows the simulation results obtained from the liquid crystal display device of Comparative Example in which the light shielding matrix and the common electrodes are not connected, the light shielding matrix was floating, and the common electrodes were grounded.

In the lines of electric force shown in FIG. 6A, the rising section R of the lines of electric force is located outside the ends P of the region positioned between both common electrodes 53, however, in the lines of electric force shown in FIG. 6B, the rising section R' of the lines of electric force is located inside the ends P' of the region positioned between both common electrodes 53, which fact indicates that in a structure having the lines of electric force shown in FIG. 6B, light leakage may occur in the region between both common electrodes 53, however, in a structure having the lines of electric force shown in FIG. 6A, light leakage does not readily occur in the region between both common electrodes 53.

Figure 7A:
FIG. 7A is a photograph showing the result of a light-leakage occurrence test using a liquid crystal display device of Example in which a light shielding matrix and common electrodes are connected and grounded.

FIG. 7A is a photograph showing the result of a light-leakage occurrence test using a liquid crystal display device having the same structure as Example in which the light shielding matrix and the common electrodes are connected and grounded. The gate electrode voltage $V_G$ at the time of driving the liquid crystal display device was set to 15 V, and the common voltage and the light shielding-matrix voltage were set to 0 V, i.e., they were grounded. Light leakage does not occur in this structure, as is shown in FIG. 7A.

Figure 7B:
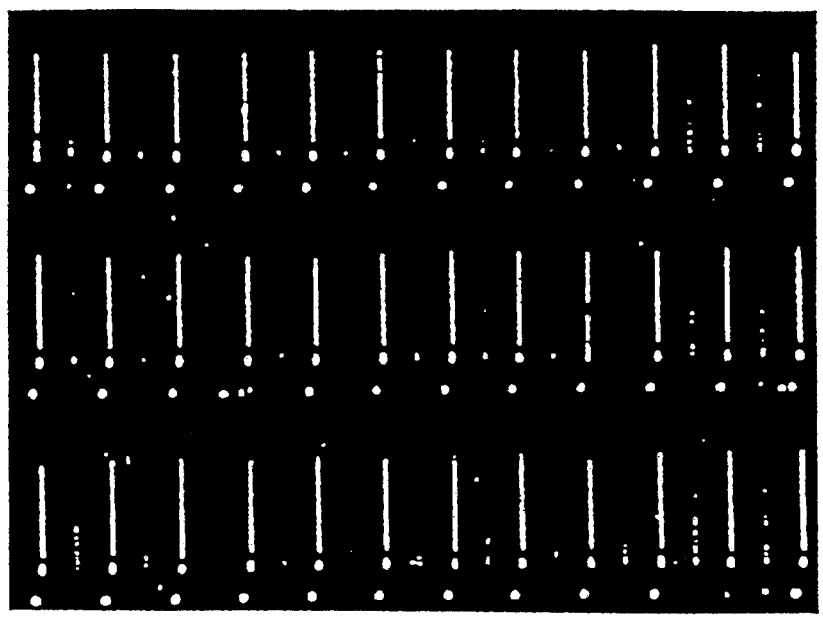
FIG. 7B is a photograph showing the result of a light-leakage occurrence test using a liquid crystal display device of Comparative Example in which the gate electrode voltage $V_G$ is set to 15 V, a light shielding matrix is floating, and common electrodes are grounded.

FIG. 7B is a photograph showing the result of a light-leakage occurrence test using a liquid crystal display device of Comparative Example in which the gate electrode voltage $V_G$ is set to 15 V, the light shielding matrix is floating, and the common electrodes are grounded. As is shown in FIG. 7B, light leakage occurs in this structure.

From the result shown in FIG. 7B, it is understood that in the liquid crystal display device of Comparative Example in which the light shielding matrix is floating and the common electrodes are grounded, light leakage occurs if the light shielding matrix has the above-described shape. Thus, it is necessary to extend the area shaded by the light shielding matrix, undesirably resulting in a reduction in the aperture ratio.

Figure 8A:
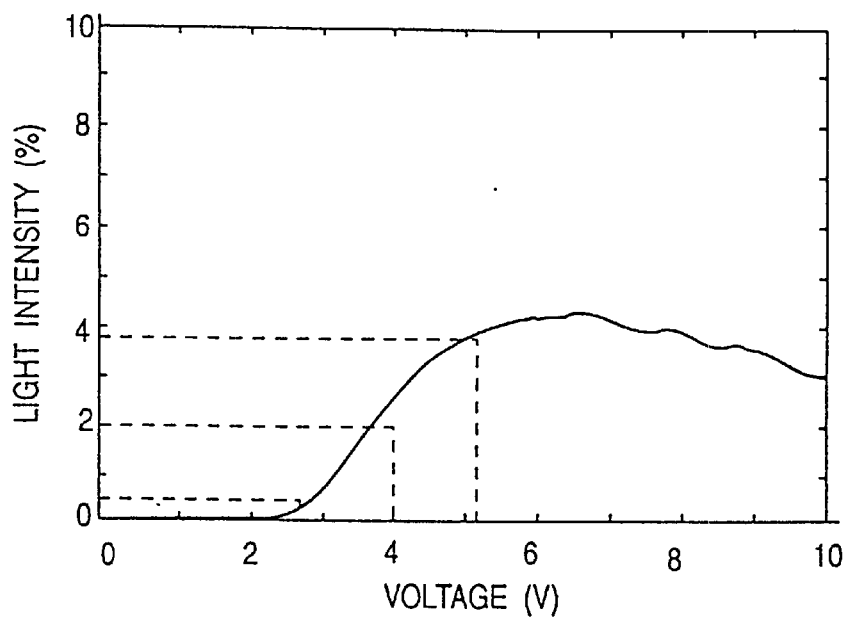
FIGS. 8A and 8B show the transmittance-driving voltage characteristics of the liquid crystal display devices of Example and Comparative Example, respectively.
Figure 8B:
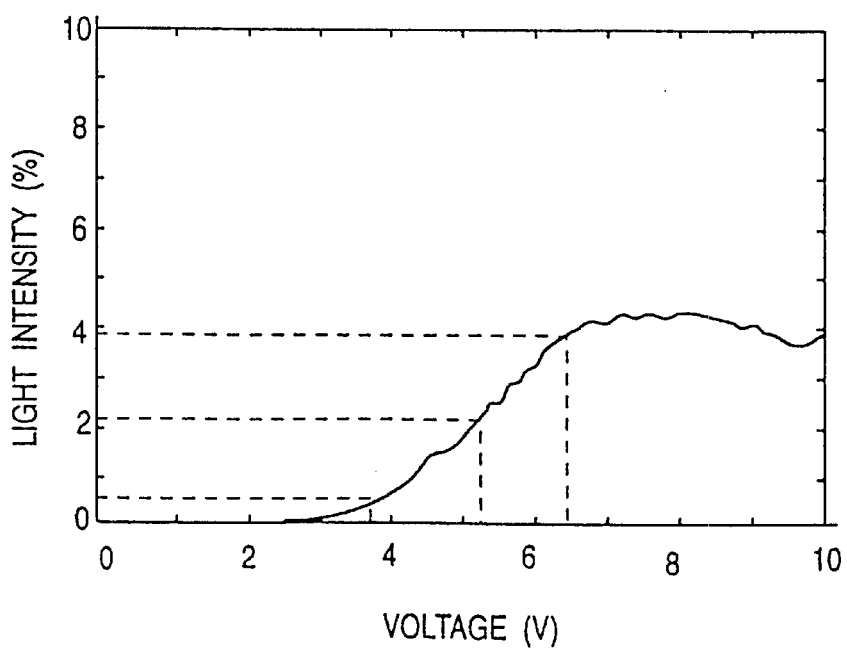
Figure 9:
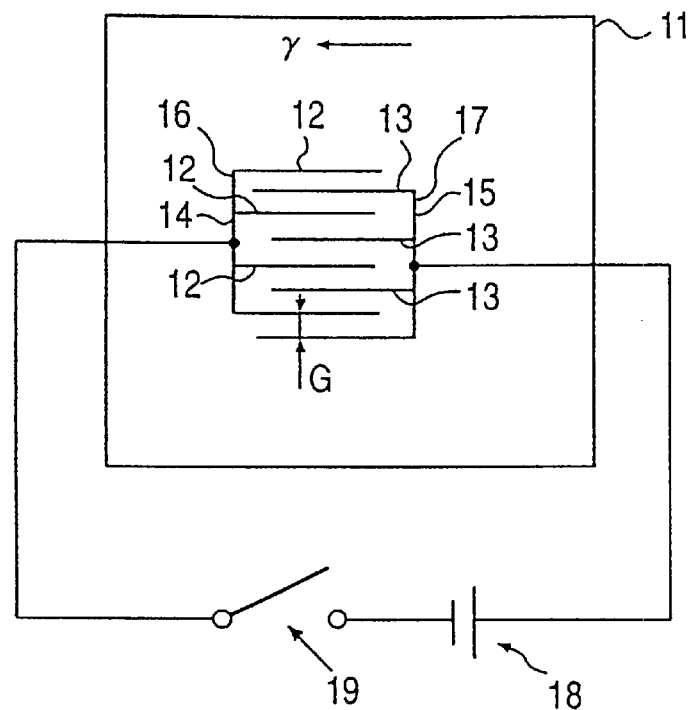
FIG. 9 is a plan view of a substrate, having linear electrodes thereon, of a liquid crystal display device of the prior art, in which device alignment of liquid crystal molecules is controlled by applying a transverse electric field.
Figure 10:
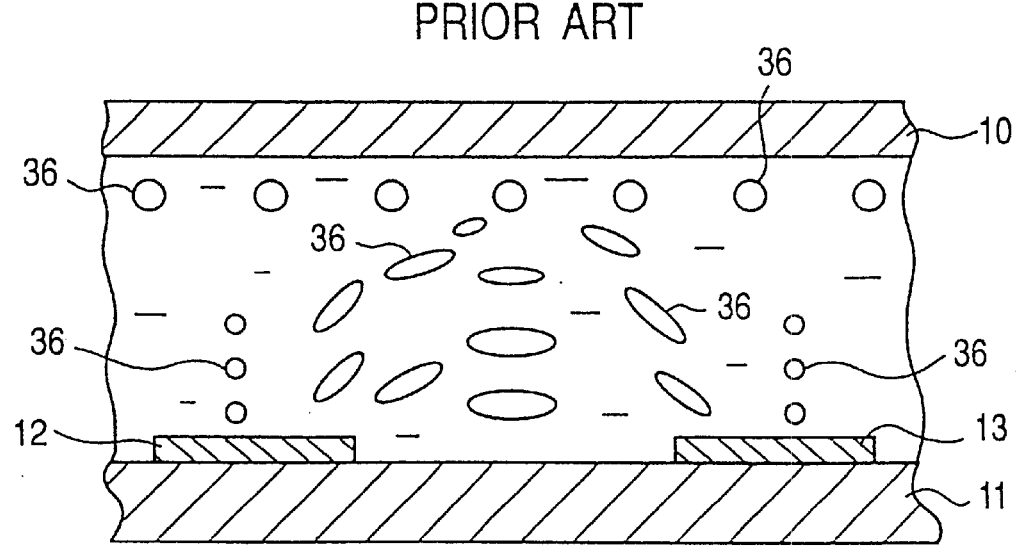
FIG. 10 shows alignment of liquid crystal molecules when a voltage is applied to the linear electrodes shown in FIG. 9.

FIGS. 8A and 8B show the transmittance-driving voltage characteristics of the liquid crystal display devices of Example and Comparative Example, respectively.

As is apparent from FIGS. 8A and 8B, the maximum transmittance of the liquid crystal display device of Example and that of the liquid crystal display device of Comparative Example are almost the same. The driving voltage required for obtaining the maximum transmittance is 6.7 V for the liquid crystal display device of Example and 7.9 V for the liquid crystal display device of Comparative Example. Thus, to achieve the same transmittance, the driving voltage of the liquid crystal display device of Example is lower than that of the liquid crystal display device of Comparative Example. As a result, the driving voltage can be reduced by 1.2 V by employing the liquid crystal display device of Example.

Figure 15:
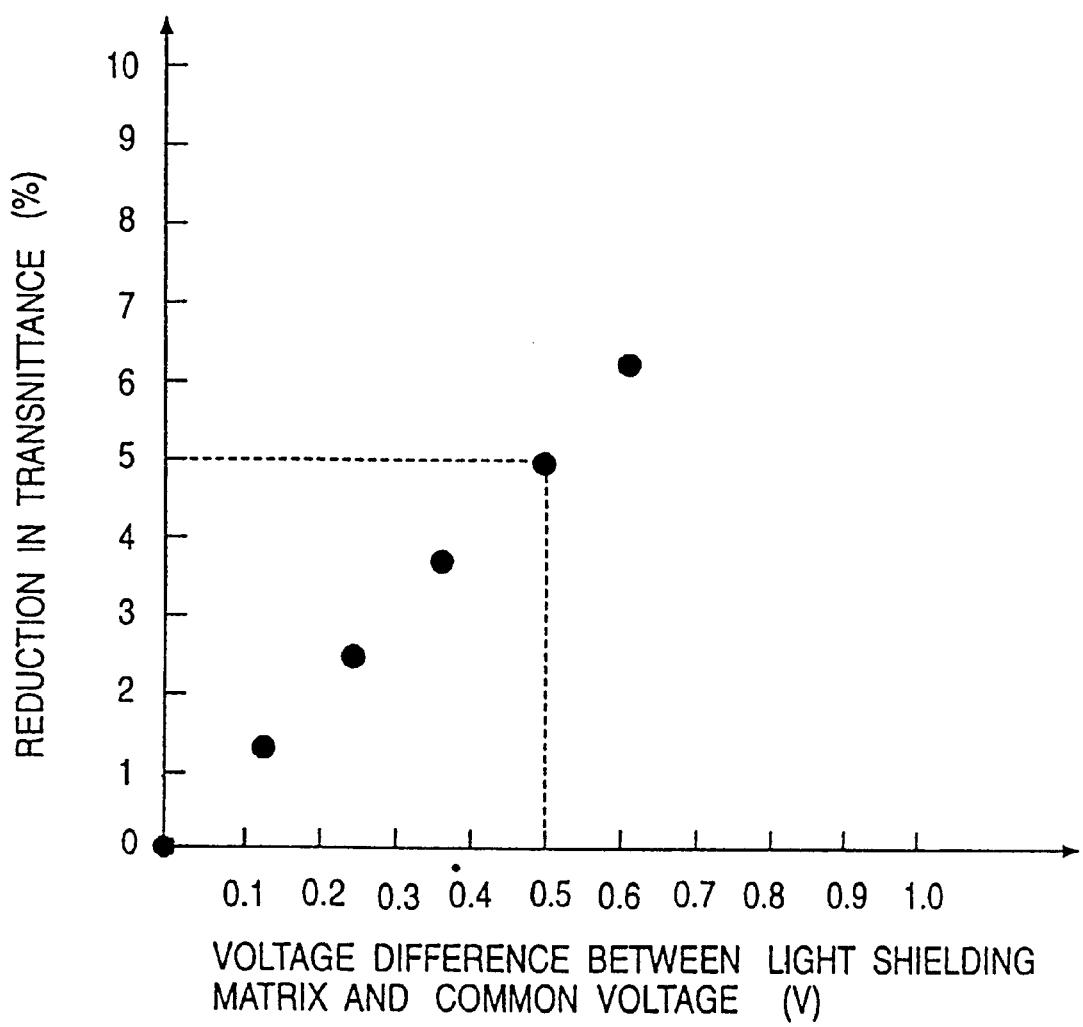
FIG. 15 shows the relationship between the reduction in the transmittance and the voltage difference between the light shielding matrix and the common electrodes in a liquid crystal display device of Example, with the transmittance obtained by setting the light shielding matrix and the common electrodes to the same voltage being defined as 100% transmittance.

FIG. 15 shows the relationship between the reduction in the transmittance and the voltage difference between the light shielding matrix and the common electrodes in the liquid crystal display device of Example. In FIG. 15, the transmittance obtained by setting the light shielding matrix and the common electrodes to the same voltage is defined as 100% transmittance.

As is apparent from FIG. 15, the reduction in the transmittance is more than 5% when the voltage difference between the light shielding matrix and the common electrodes exceeds 0.5 V. Therefore, to obtain a sufficient voltage difference, it is effective to set the voltage difference between the light shielding matrix and the common electrodes in a range of from +0.5 V to −0.5 V, both inclusive.

Figure 16:
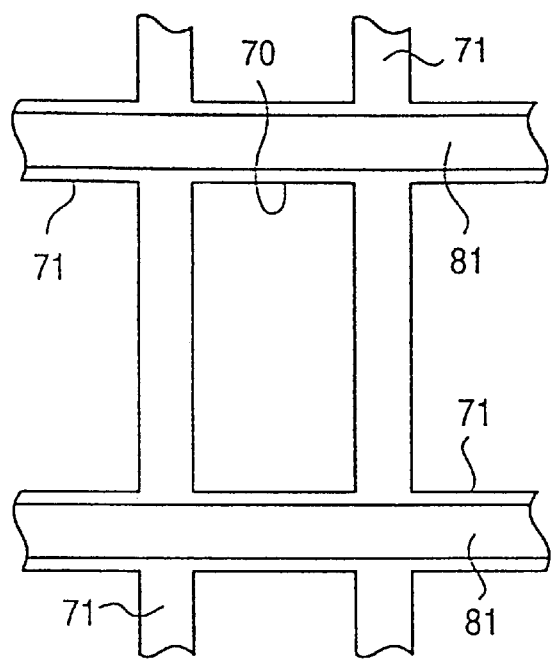
FIG. 16 shows a structural example incorporated in the present invention.
Figure 17:
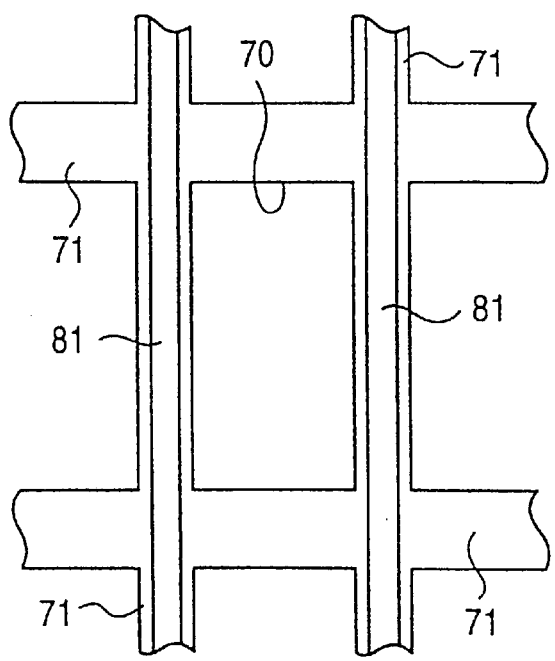
FIG. 17 shows another structural example incorporated in the present invention.
Figure 18:
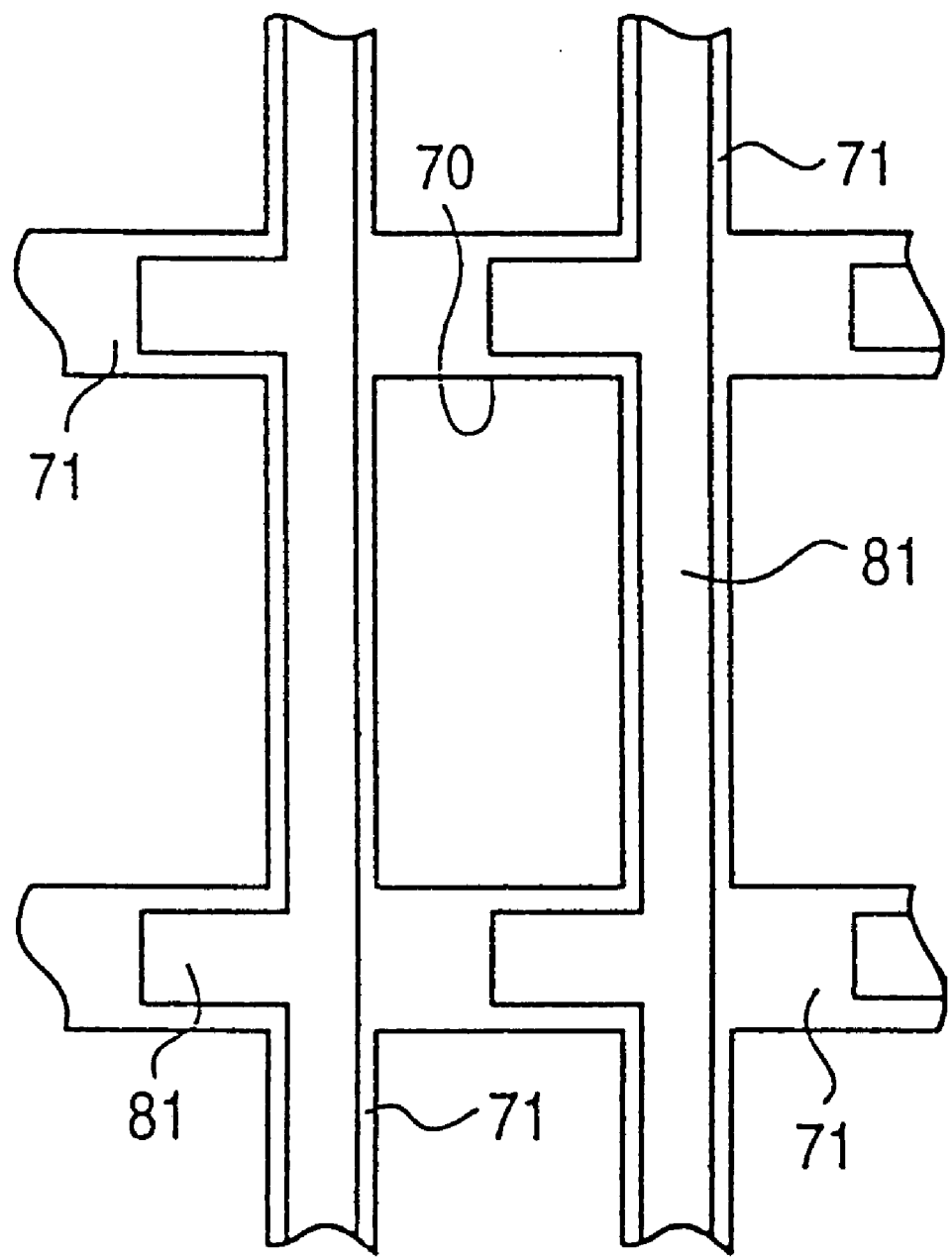
FIG. 18 shows still another structural example incorporated in the present invention.

FIGS. 16 to 18 show other examples in which the conductive films 81 at substantially the same voltage as the common electrodes are partially provided above the light shielding matrix 71.

According to the structure shown in FIG. 16, the strip-shaped conductive films 81 are provided in the horizontal direction such that they sandwich the top and bottom sides of the openings 70, each opening corresponding to a pixel region. In the structure shown in FIG. 17, the strip-shaped conductive films 81 are provided in the vertical direction such that they sandwich the right and left sides of the openings 70, each opening corresponding to a pixel region. In the structure shown in FIG. 18, the strip-shaped conductive films 81 are provided in both the horizontal direction and the vertical direction such that they sandwich the entire right and left sides and approximately a half of the top and bottom sides of the openings 70, each opening corresponding to a pixel region.

In the above structures of FIGS. 16 to 18, similar effects to those obtained in the structure which is described above with reference to FIG. 5 can be obtained.

As is mentioned above, according to the present invention, a light shielding matrix and common electrodes are set to substantially the same voltage in a liquid crystal display device in which liquid crystal alignment is controlled by applying a transverse electric field in a direction parallel to the substrate using the common electrodes and pixel electrodes. Disturbance of the lines of electric force applied to the liquid crystal in regions corresponding to the common electrodes can be thereby reduced and the liquid crystal in those regions can be used for displaying. Thus, it becomes unnecessary to shade the regions corresponding to the common electrodes by the light shielding matrix, a fact which allows the light shielding matrix to have wider openings as compared with conventional cases. The resulting liquid crystal display device achieves higher aperture ratio as compared with those having conventional structures in which the light shielding matrix is electrically floating.

Therefore, a liquid crystal display device having a high aperture ratio and a wider angle of view can be provided, in which the dark and bright states are switched according to the liquid-crystal alignment which is controlled by the application of a transverse electric field.

Furthermore, since the aperture ratio can be improved by enlarging the openings of the light shielding matrix by reducing the alignment disorder of the liquid crystal in regions corresponding to the common electrodes, the driving voltage required to obtain the maximum transmittance can be decreased, which fact means that the liquid crystal display device can be driven using less electric power.

The above structure can also be applied to a structure in which a conductive film having the same shape as that of the light shielding matrix is formed on the light shielding matrix with an insulating film therebetween. In such a case, similar effects to the above structure can be obtained by connecting the conductive film and the common electrode to substantially the same voltage. "Substantially the same voltage" means that the voltage difference between the conductive film and the common electrodes is set in a range of from −0.5 V to +0.5 V, both inclusive. When the voltage difference is in the above range, the above effects can be ensured.

For reliably setting the common electrodes and the light shielding matrix or the conductive film to substantially the same voltage, connecting terminals of the common electrodes and the light shielding matrix or the conductive film may be extended to the peripheral edges of the substrates, on which the common electrodes and the light shielding matrix or the conductive film are formed, and be connected to each other by a conductive member such as a conductive paste.

In addition, for reliably setting the common electrodes and the light shielding matrix or the conductive film to substantially the same voltage, the common electrodes and the light shielding matrix or the conductive film may be partially extended outside the sealing member, encapsulating liquid crystal between the substrates, so as to be connected to each other by a conductive member such as a conductive paste.

What is claimed is:

1. A liquid crystal display device comprising:
a first substrate and a second substrate;
a liquid crystal layer provided between said first and second substrates;
a plurality of pixel regions provided on the surface opposing said second substrate of said first substrate, each of said pixel regions comprising at least one pixel electrode and a common electrode cooperatively applying an electric field in a direction along the surface of said first substrate; and
a conductive light shielding matrix provided on the surface opposing said first substrate of said second substrate, the entire light shielding matrix having the same conductivity, said light shielding matrix having openings, each corresponding to a display region of each of said pixel regions, and shading non-display regions other than said pixel regions;
wherein a conductive film at substantially the same voltage as said common electrode is formed at least above said light shielding matrix with an insulating film interposed therebetween.

2. The liquid crystal display device as set forth in claim 1, wherein the voltage difference between said conductive film and said common electrode is set in a range of from −0.5 V to +0.5 V both inclusive.

3. The liquid crystal display device according to claim 1, wherein the common electrode and the pixel electrode are on different layers.

4. The liquid crystal display device according to claim 1, wherein the light shielding matrix includes chromium.

5. The liquid crystal display device according to claim 1, wherein the light shielding matrix includes chromium and chromium oxide.

6. The liquid crystal display device according to claim 1, wherein the light shielding matrix includes chromium oxide.

7. The liquid crystal display device according to claim 1, wherein the conductive film has an opening substantially the same size as the opening in the light shielding matrix.

8. The liquid crystal display device according to claim 1, wherein the conductive film includes a transparent layer.

9. The liquid crystal display device according to claim 1, wherein the conductive film includes an opaque layer.

10. The liquid crystal display device according to claim 1, wherein the conductive film is in a horizontal direction.

11. The liquid crystal display device according to claim 1, wherein the conductive film is in a vertical direction.

12. The liquid crystal display device according to claim 1, wherein the conductive film has a first portion in a first direction and a second portion in a second direction is in a horizontal direction.

13. A liquid crystal display device, comprising:
a first substrate and a second substrate;
a liquid crystal layer provided between said first and second substrates;
a plurality of pixel regions provided on the surface opposing said second substrate of said first substrate, each of said pixel regions comprising at least one pixel electrode and a common electrode cooperatively applying an electric field in a direction along the surface of said first substrate; and
a conductive light shielding matrix provided on the surface opposing said first substrate of said second substrate, the entire light shielding matrix having the same conductivity, said light shielding matrix having openings, each corresponding to a display region of each of said pixel regions, and shading non-display regions other than said pixel regions;
wherein said light shielding matrix and said common electrode are set to substantially the same voltage and wherein the light shielding matrix includes chromium and chromium oxide.

14. A liquid crystal display device, comprising:
a first substrate and a second substrate;
a liquid crystal layer provided between said first and second substrates;
a plurality of pixel regions provided on the surface opposing said second substrate of said first substrate, each of said pixel regions comprising at least one pixel electrode and a common electrode cooperatively applying an electric field in a direction along the surface of said first substrate; and a conductive light shielding matrix provided on the surface opposing said first substrate of said second substrate, the entire light shielding matrix having the same conductivity, said light shielding matrix having openings, each corresponding to a display region of each of said pixel regions, and shading non-display regions other than said pixel regions;

wherein said light shielding matrix and said common electrode are set to substantially the same voltage and wherein the light shielding matrix includes chromium oxide.

* * * * *